(12) United States Patent
Yu

(10) Patent No.: US 7,775,677 B2
(45) Date of Patent: Aug. 17, 2010

(54) ADAPTER DEVICE FOR COMPACT FLUORESCENT LAMP HAVING EYESIGHT PROTECTION FUNCTION

(76) Inventor: Hang Jae Yu, 409-303, Grand Villa, Hayanmaul, Gumi-dong, Bundang-gu, Sungnam-si (KR) 463-793

( * ) Notice: Subject to any disclaimer, the term of this patent is extended or adjusted under 35 U.S.C. 154(b) by 112 days.

(21) Appl. No.: 12/081,183

(22) Filed: Apr. 11, 2008

(65) Prior Publication Data
US 2009/0176394 A1 Jul. 9, 2009

(30) Foreign Application Priority Data
Jan. 8, 2008 (KR) .................. 10-2008-0001982

(51) Int. Cl.
*F21V 9/00* (2006.01)
(52) U.S. Cl. .................. 362/231; 362/249.02; 362/260; 439/236
(58) Field of Classification Search .................. 362/231, 362/249.02, 260; 439/236
See application file for complete search history.

(56) References Cited
U.S. PATENT DOCUMENTS
5,599,090 A  2/1997  Waldmann

2005/0265035 A1* 12/2005 Brass et al. .................. 362/451
2007/0258240 A1* 11/2007 Ducharme et al. .......... 362/231

FOREIGN PATENT DOCUMENTS

| DE | 10 2006 041 533 A1 | 3/2008 |
| KR | 20-0426127 Y1 | 9/2006 |
| KR | 10-2008-0009336 A | 1/2008 |
| WO | WO-2005/012785 A1 | 2/2005 |
| WO | WO-2008/028857 A1 | 3/2008 |

\* cited by examiner

*Primary Examiner*—Sandra L O'Shea
*Assistant Examiner*—Meghan K Dunwiddie
(74) *Attorney, Agent, or Firm*—Birch, Stewart, Kolasch & Birch, LLP

(57) ABSTRACT

Disclosed herein is an adapter device for enabling the use of a compact fluorescent lamp in a lighting apparatus having a socket for an incandescent lamp. The adapter device includes a fastening structure, a cap, green and red Light Emitting Diodes (LEDs), and a Direct Current (DC) power supply. The fastening structure fastens the compact fluorescent lamp. The cap supplies Alternating Current (AC) power to the fastening structure. The green LEDs emit light in a wavelength range of 498-530 nm, and the red LEDs emit light in a wavelength range of 620-700 nm. The LEDs are installed around the compact fluorescent lamp. The Direct Current (DC) power supply supplies DC power to the green LEDs and the red LEDs.

8 Claims, 9 Drawing Sheets

ADAPTER DEVICE FOR COMPACT FLUORESCENT LAMP HAVING EYESIGHT PROTECTION FUNCTION

BACKGROUND OF THE INVENTION

1. Field of the Invention

The present invention relates generally to an adapter device for a compact fluorescent lamp having an eyesight protection function, and, more particularly, to an adapter device for a compact fluorescent lamp that enables the additional emission of light having wavelengths that are not emitted by existing compact fluorescent lamps but are essential for color vision.

2. Description of the Related Art

Incandescent lamps (tungsten lamps, halogen lamps, and krypton lamps) have an advantage in that they are suitable for the protection of eyesight because they have excellent color rendering, and thus they emit light closest to natural light, unlike fluorescent lamps (general fluorescent lamps and compact fluorescent lamps). Accordingly, although they have a shortcoming in that they have high power consumption, they are widely used as home and business lighting apparatuses (for example, desk lamps) in many western countries and they are also used for high-quality illumination in Korea.

In contrast, since fluorescent lamps have worse color rendering than incandescent lamps but have very low power consumption, they are widely used as streetlamps and for hall lighting in many western countries, and they are widely used in homes and offices in Korea.

Meanwhile, as the costs of energy resources, such as petroleum, are increasing rapidly, many western countries, including the U.S., have recently established regulations stipulating that existing high-power consumption incandescent lamps be replaced with low-power consumption lamps by 2011 or 2012.

As a result, the development of low-power consumption lighting apparatuses having excellent color rendering is a pressing global issue. A conventional full-spectrum type fluorescent lamp (the lamp's CRI is around 90-95) and a Light Emitting Diode (LED) lamp have been proposed as solutions for this issue.

The full-spectrum type fluorescent lamp will be described first.

Of existing compact fluorescent lamps shown in FIG. 2, a conventional deluxe type fluorescent lamp (the lamp's CRI is around 80-85) is inexpensive (one to three dollar). However, since the fluorescent material applied to the inner glass of the deluxe type fluorescent lamp is mainly a phosphate, silicate or tungstate compound, large amounts of blue light in a wavelength range of 430 to 450 nm, red-orange light in a wavelength range of 600 to 620 nm and yellow-green light in a range of 530 to 560 nm are emitted, while small amounts of pure red light in a wavelength range of 620 to 700 nm and pure green light in a wavelength range of 498 to 530 nm, which are present in natural light in large amounts, are emitted, as shown in the upper graph of FIG. 1. Therefore, the deluxe type fluorescent lamp has problems related to color rendering and sharpness, and thus it causes eye fatigue when it is used for a long time.

In order to mitigate the shortcoming of the deluxe type fluorescent lamp, the full-spectrum type fluorescent lamp, which is constructed by adding a phosphorus compound to fluorescent material for the deluxe type fluorescent lamp and emits a large amount of light at red wavelengths, has been invented. However, it is impossible to manufacture it at low cost because the phosphorus compound is a rare material and very expensive, and the yield of the full-spectrum type fluorescent lamps capable of emitting five-wavelength light is very low, so that a true full-spectrum type fluorescent lamp costs more than several tens of dollars each. Furthermore, currently commercialized inexpensive full-spectrum type fluorescent lamps (about 5 dollars each) do not emit sufficient amounts of light at the additional wavelengths, even though there are referred to as full-spectrum type fluorescent lamps. Accordingly, the currently commercialized inexpensive full-spectrum type fluorescent lamps are far from being lamps for emitting natural light.

Next, an LED lamp will be described.

Currently, commercial Light Emitting Diodes (LEDs), which emit light having various colors, are being marketed. However, since manufacturing a lighting apparatus by combining LEDs for various colors so as to emit light similar to natural light requires hundreds of LEDs to emit sufficient light for such a lighting apparatus, a manufacturing cost higher than that for a deluxe type fluorescent lamp is incurred, and it is difficult to control the considerable amount of heat emitted from the hundreds of LEDs, with the result that it is not desirable to manufacture a lighting apparatus for emitting light similar to natural light using only LEDs, from the viewpoints of the manufacturing cost and the emission of heat.

Meanwhile, in western countries, tens of various lighting apparatuses for incandescent lamps, such as desk lamps and dining table lamps, are installed in each home. When the various lighting apparatuses for incandescent lamps are replaced with new lighting apparatuses pursuant to the established regulations, problems will arise in that a lot of expense will be incurred for the replacement of the lighting apparatuses and a lot of further expense will be incurred for the disposal of the lighting apparatuses.

SUMMARY OF THE INVENTION

Accordingly, the present invention has been made keeping in mind the above problems occurring in the prior art, and an object of the present invention is to provide an adapter device for a compact fluorescent lamp that enables existing various lighting apparatuses for incandescent lamps to be utilized without change, enables a low-power consumption compact fluorescent lamp to be used instead of a high-power consumption incandescent lamp, and can improve the color rendering of a compact fluorescent lamp having low color rendering.

In order to accomplish the above object, the present invention provides an adapter device for enabling the use of a compact fluorescent lamp in a lighting apparatus having a socket for an incandescent lamp, the adapter device including a fastening structure for fastening the compact fluorescent lamp; a cap for supplying Alternating Current (AC) power to the fastening structure; green Light Emitting Diodes (LEDs) for emitting light in a wavelength range of 498-530 nm and red LEDs for emitting light in a wavelength range of 620-700 nm, the LEDs being installed around the compact fluorescent lamp; and a Direct Current (DC) power supply for supplying DC power to the green LEDs and the red LEDs.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
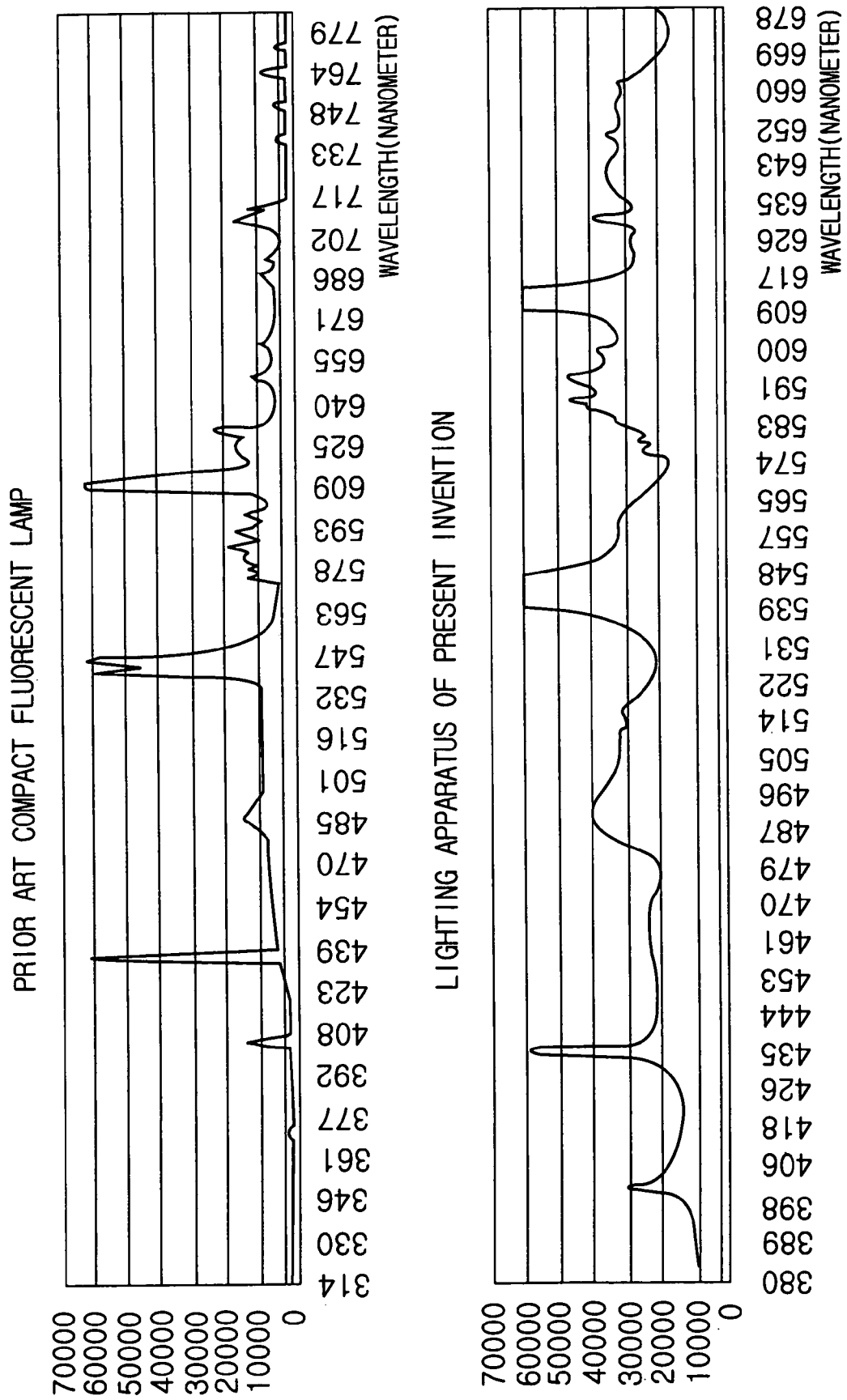
FIG. 1 is a view illustrating the distributions of the wavelengths of a prior art compact fluorescent lamp and a lighting apparatus according to the present invention.

Reference now should be made to the drawings, in which the same reference numerals are used throughout the different drawings to designate the same or similar components.

Figure 2A:
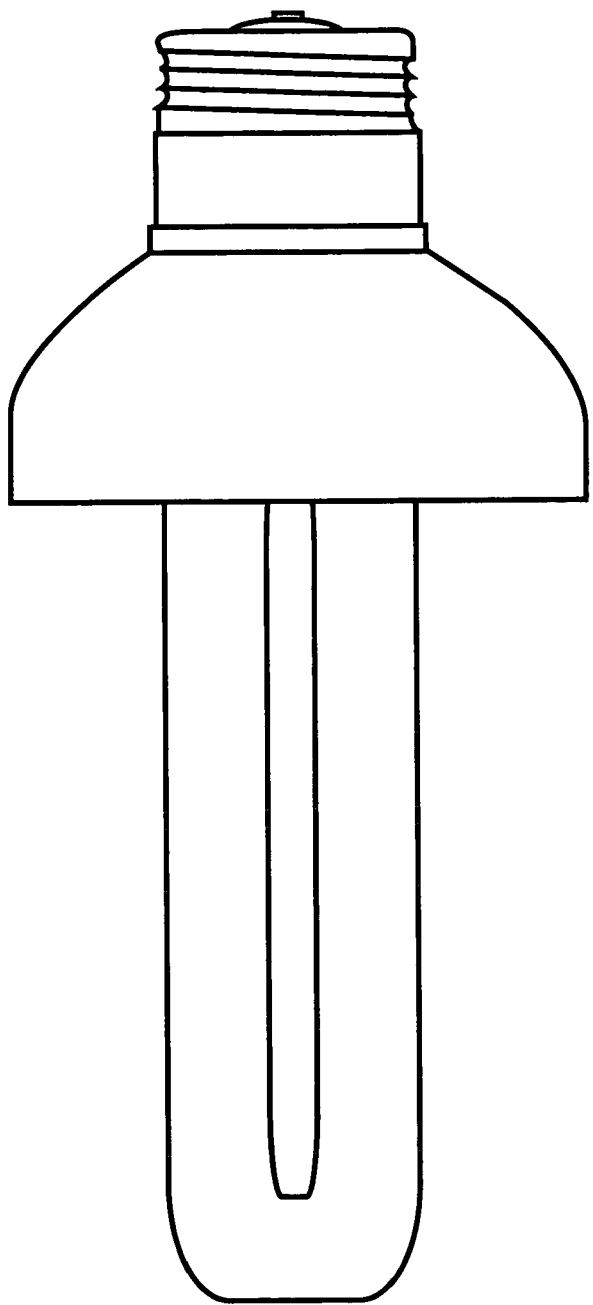
FIGS. 2A and 2B are views of typical compact fluorescent lamps.
Figure 2B:
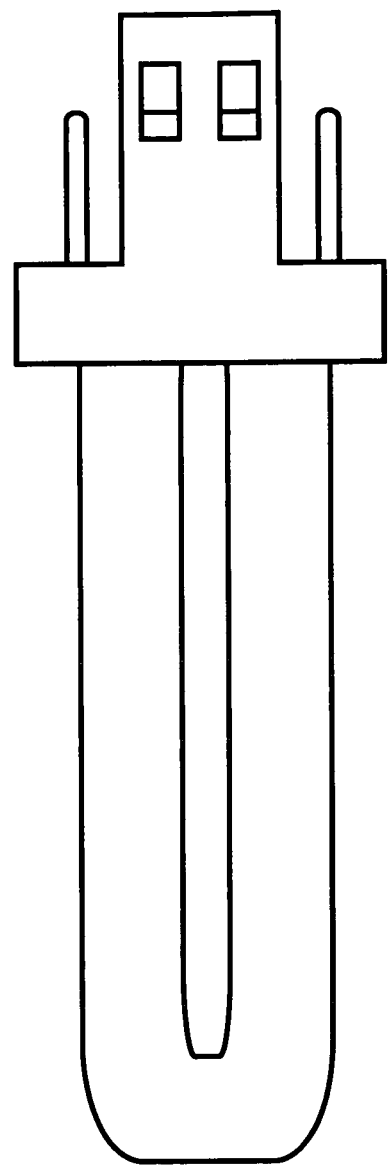

Compact fluorescent lamps are classified into a built-in ballast-type EL lamp, shown in FIG. 2A, and a ballast non-built-in type PL lamp, shown in FIG. 2B. If green light in a wavelength range of 498 to 530 nm and red light in a wavelength range of 620 to c495 nm, which are emitted in small amounts from such a compact fluorescent lamp, as shown in the upper graph of FIG. 1, are added in sufficient amounts, color rendering and sharpness can be considerably improved, with the result that humans have a natural feeling when they view objects, and thus their eyesight can be protected. Here, the wavelength c495 nm is obtained by combining a red wavelength with a violet wavelength. In practical implementation, it can be created by combining red wavelengths in a range of 620-700 nm and violet wavelengths in a range of 380-400 nm.

As a result, if green light in a wavelength range of 498-530 nm, red light in a wavelength range of 620-700 nm and violet light in a wavelength range of 380-400 nm are added to light emitted from an existing compact fluorescent lamp, color rendering and sharpness are improved (the improvement of rendering means that the original color of an object can be viewed accurately) and objects can be naturally viewed, thereby protecting a viewer's eyesight.

Accordingly, if green light in a wavelength range of 498-530 nm and red light in a wavelength range of 620-700 nm are added to light emitted from an existing compact fluorescent lamp, a viewer can have the sensation in which resulting light is similar to natural light. If violet light in a wavelength range of 380 to 400 nm is further employed, the sensation in which light is similar to natural light can be further enhanced.

Furthermore, according to recent research, if bluish green light having wavelengths around 495 nm, to which rod cells have high sensitivity, is added, most photoreceptor cells are highly activated, and thus objects can be more clearly viewed, with the result that color rendering and sharpness are improved, thereby aiding in protecting eyesight.

Now, an adapter device for a compact fluorescent lamp according to the present invention, capable of improving color rendering and sharpness in the case in which a compact fluorescent lamp is used instead of an incandescent lamp in a lighting apparatus in which an incandescent lamp is normally used, will be described below.

Figure 3A:
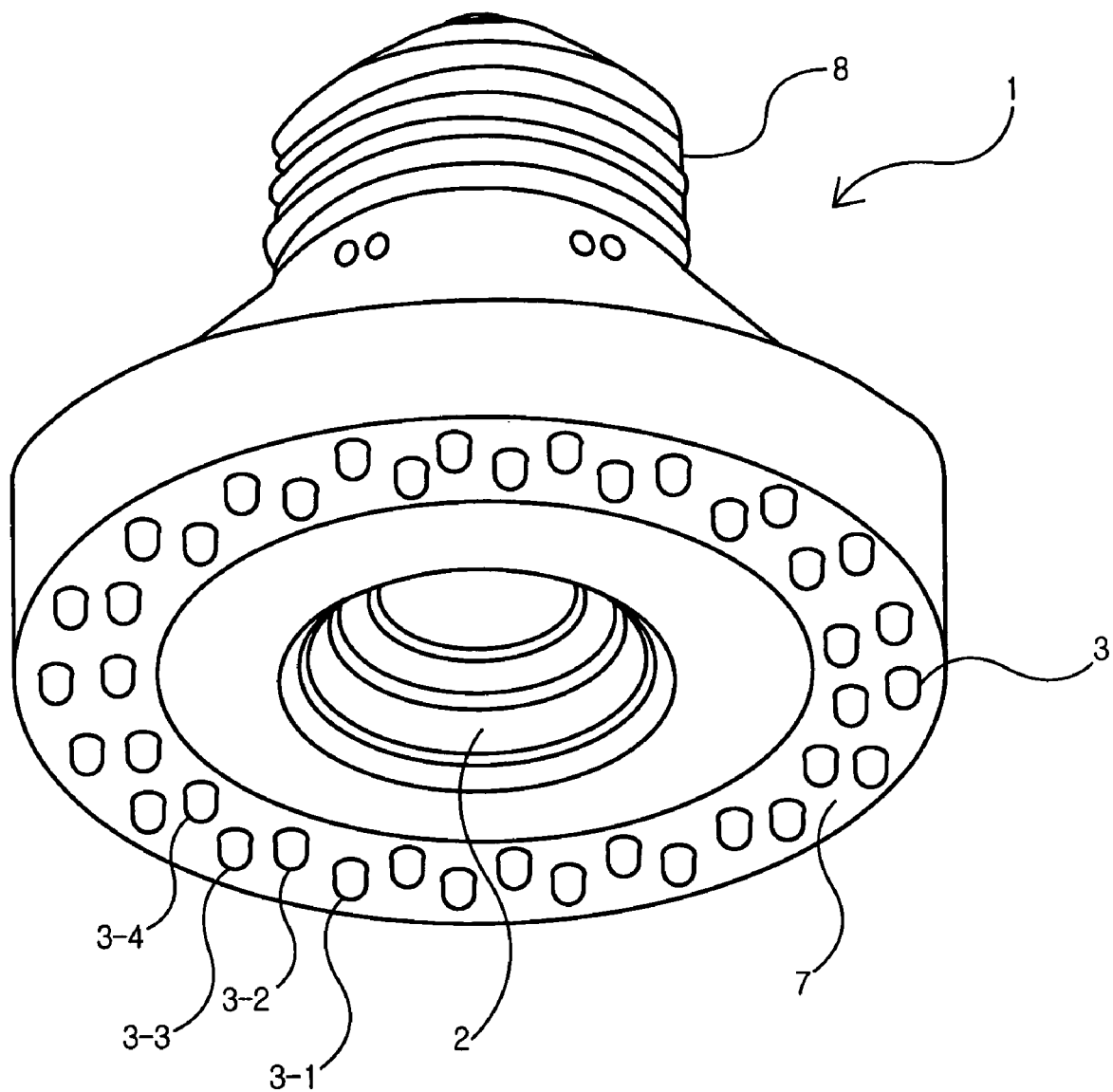
FIGS. 3A to 3C are a perspective view of an adapter device for a built-in ballast-type compact fluorescent lamp according to the present invention, a front view thereof, and a view showing the installation of a built-in ballast-type compact fluorescent lamp in the adapter device, respectively.
Figure 3B:
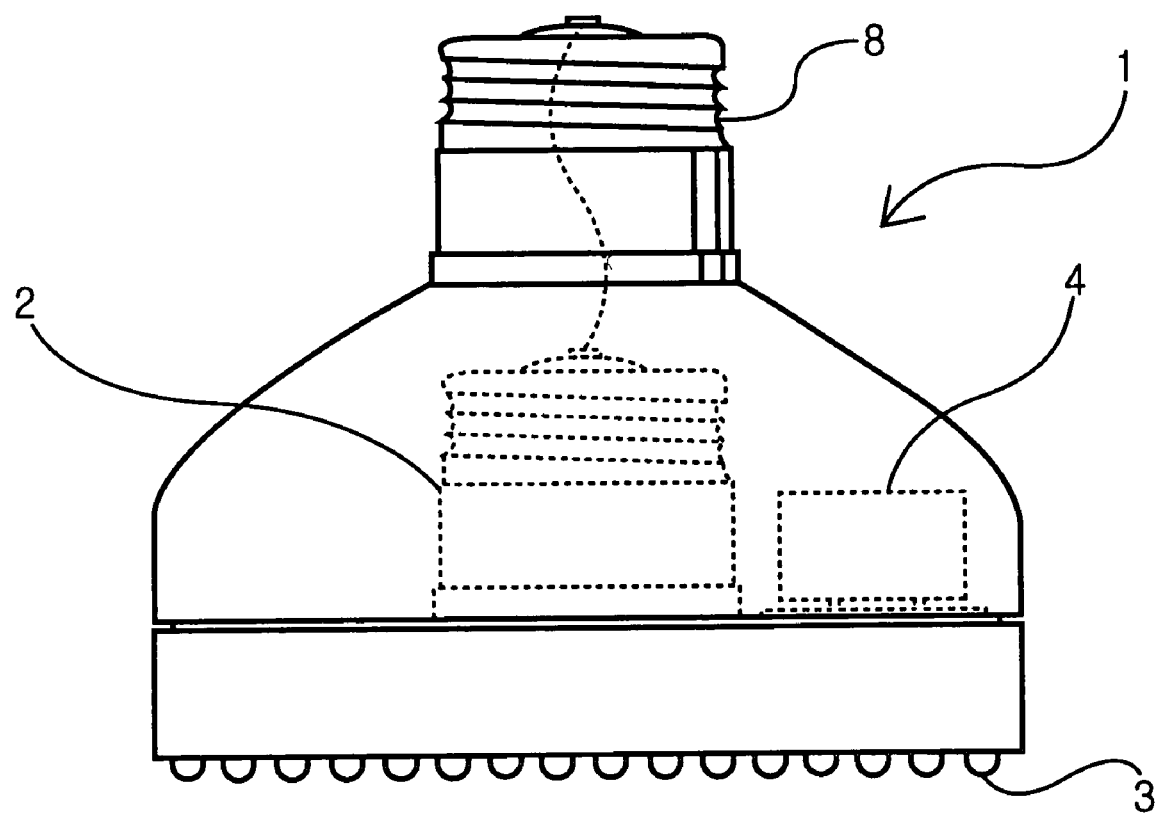
Figure 3C:
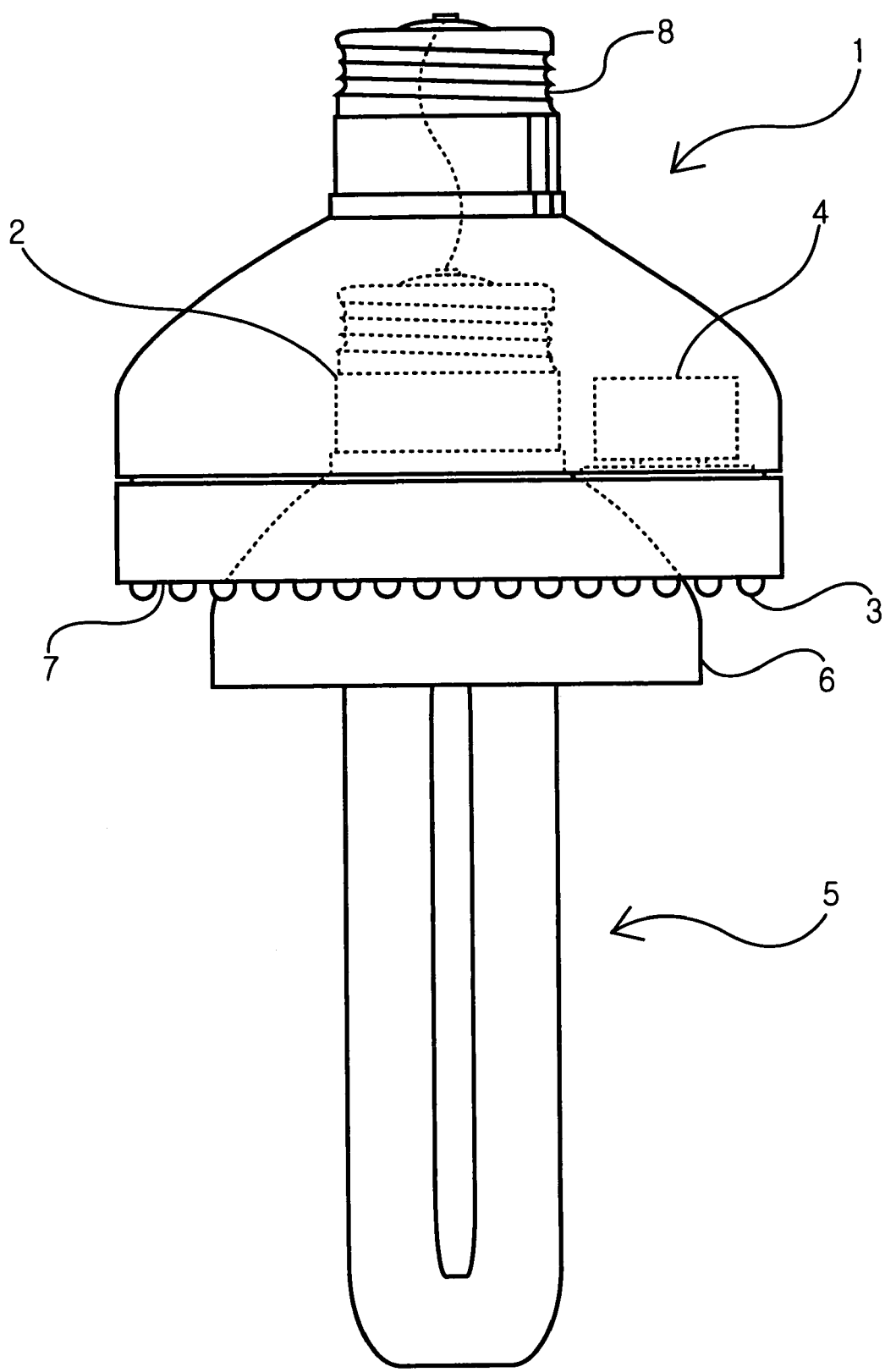

First, an adapter device 1 for a built-in ballast-type compact fluorescent lamp according to the present invention, capable of improving color rendering and sharpness in the case in which a built-in ballast-type compact fluorescent lamp, such as that shown in FIG. 2A, is used, will be described with reference to FIGS. 3A to 3C. FIG. 3A is a perspective view showing the appearance of the adapter device 1 for a built-in ballast-type compact fluorescent lamp, FIG. 3B is a front view showing the internal construction of the adapter device 1, and FIG. 3C is a view showing the combination of the adapter device 1 of the present invention with a built-in ballast-type compact fluorescent lamp 5.

The adapter device 1 of the present invention is provided with a threaded fastening structure 2, into which the built-in ballast-type compact fluorescent lamp 5 is fitted through rotation. The threaded fastening structure 2 is made of metal, and is connected to a cap 8 through a contact wire. The cap 8 is engaged with the incandescent lamp fastening structure of a lighting apparatus for an incandescent lamp in a threaded manner, and, in turn, is connected to 120 V Alternating Current (AC) power, in the case of the U.S. That is, the threaded fastening structure 2 has the same construction as an existing socket for an incandescent lamp. Furthermore, a plurality of LEDs 3 is arranged along the outer portion 7 of the bottom of the adapter device 1 that is not covered by the body 6 of the built-in ballast-type compact fluorescent lamp 5, and the LEDs 3 are fastened to a board (not shown) inside the adapter device 1 and a DC power supply 4 for supplying DC current to the LEDs 3 is disposed on the board. Although, in FIG. 3A, the LEDs 3 are illustrated as being arranged in two rows in the circumferential direction, the LEDs 3 may alternatively be arranged in a single row or in three or more rows.

Here, the plurality of LED 3 includes green LEDs 3-1 for emitting light in a wavelength range of 498-530 nm, red LEDs 3-2 for emitting light in a wavelength range of 620-700 nm, bluish green LEDs 3-3 for emitting light at wavelengths around 495 nm, and violet LEDs 3-4 for emitting light in a wavelength range of 350-400 nm, which are appropriately arranged along the outer portion 7 of the bottom of the adapter device 1, as shown in FIG. 3A.

In this case, the number and light intensity of LEDs 3-1, 3-2, 3-3, and 3-4 are appropriately determined in consideration of the wattage of the built-in ballast-type compact fluorescent lamp 5 used and the desired improvement in color rendering and sharpness.

That is, as the wattage of the built-in ballast-type compact fluorescent lamp 5 increases or decreases, the number of LEDs 3-1, 3-2, 3-3, and 3-4 increases or decreases. In the case in which it is desired to provide reasonably good color rendering and sharpness, only green LEDs 3-1 and red LEDs 3-2 are installed. In the case in which it is desired to provide excellent color rendering and sharpness, violet LEDs 3-4 are installed along with green LEDs 3-1 and red LEDs 3-2. In the case in which it is desired to provide the best color rendering and sharpness, bluish green LEDs 3-3 are installed along with green LEDs 3-1, red LEDs 3-2 and violet LEDs 3-4, as shown in FIG. 3A.

Now, when the built-in ballast-type compact fluorescent lamp 5 is fitted into the threaded fastening structure 2 of the adapter device 1 of the present invention in a threaded fashion, the cap 8 is fitted into the socket of a lighting apparatus for an incandescent lamp (not shown), as shown in FIG. 3C, and then a user turns on the lighting apparatus, the built-in ballast-type compact fluorescent lamp 5 is lit using AC power, and the LEDs 3-1, 3-2, 3-3 and 3-4 are lit using the DC power supply 4.

Here, the built-in ballast-type compact fluorescent lamp 5 emits large amounts of blue light in a wavelength range of 430-450 nm, red-orange light in a wavelength range of 600-620 nm and yellow-green light in a wavelength range of 530-560 nm, in which case the built-in ballast-type compact fluorescent lamp 5 functions as a main light source.

Furthermore, the LEDs 3-1 emit green light in a wavelength range of 498-530 nm, the LEDs 3-2 emit red light in a wavelength range of 620-700 nm, the LEDs 3-3 emit bluish green light in a wavelength range around 495 nm, and LEDs 3-4 emit violet light in a wavelength range of 350-400 nm. Accordingly, light having important wavelengths, which are not provided by the built-in ballast-type compact fluorescent lamp 5 but are provided by natural light, can be provided, thereby improving color rendering and sharpness.

As a result, when the existing built-in ballast-type compact fluorescent lamp 5 is combined with the adapter device 1 of the present invention, as shown in FIG. 3C, and AC power is applied thereto, the built-in ballast-type compact fluorescent lamp 5 provides general brightness as a main light source, and the light of the green LEDs 3-1 in a wavelength range of 498-530 nm, the light of the red LEDs 3-2 in a wavelength range of 620-700 nm, the light of the bluish green LED 3-3 at wavelengths around 495 nm and the light of the violet LEDs 3-4 in a wavelength range of 350-400 nm improve color rendering and sharpness.

Meanwhile, since the LEDs 3-1, 3-2, 3-3 and 3-4 are not intended to provide general brightness but are intended to improve color rendering and sharpness, the device of the present invention requires only a small number of LEDs compared to an LED lamp device, with the result that the device of the present invention reduces the manufacturing cost and decreases the amount of heat generated compared to an LED lamp device.

Next, an adapter device for a non-built-in ballast-type compact fluorescent lamp 15 according to the present invention, capable of improving color rendering and sharpness in the case in which the non-built-in ballast-type compact fluorescent lamp, such as that shown in FIG. 2B, is used, will be described with reference to FIGS. 4A to 4C.

Figure 4A:
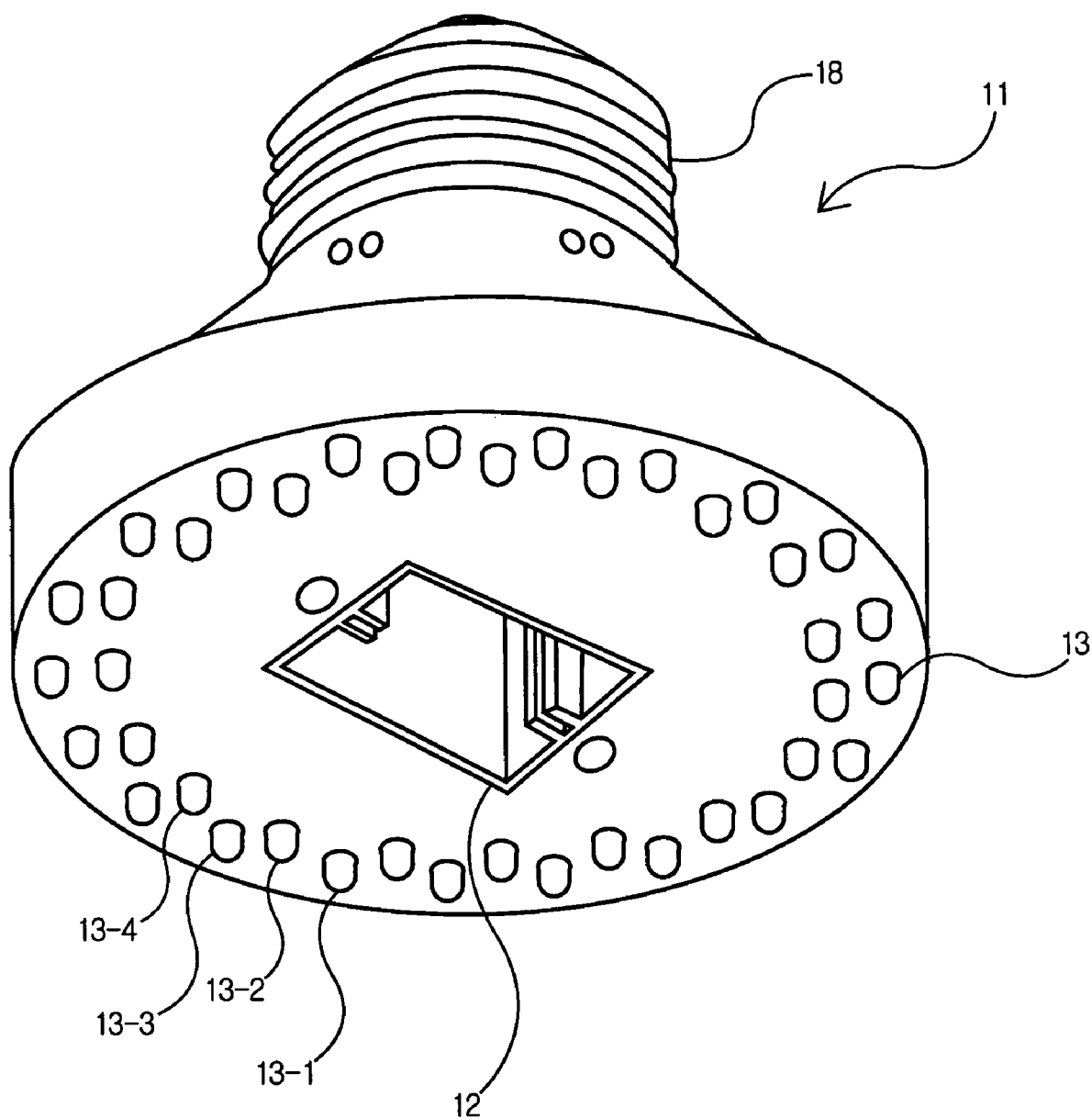
FIGS. 4A to 4C are a perspective view of an adapter device for a non-built-in ballast-type compact fluorescent lamp according to the present invention, a front view thereof, and a view showing the installation of a non-built-in ballast-type compact fluorescent lamp in the adapter device, respectively.
Figure 4B:
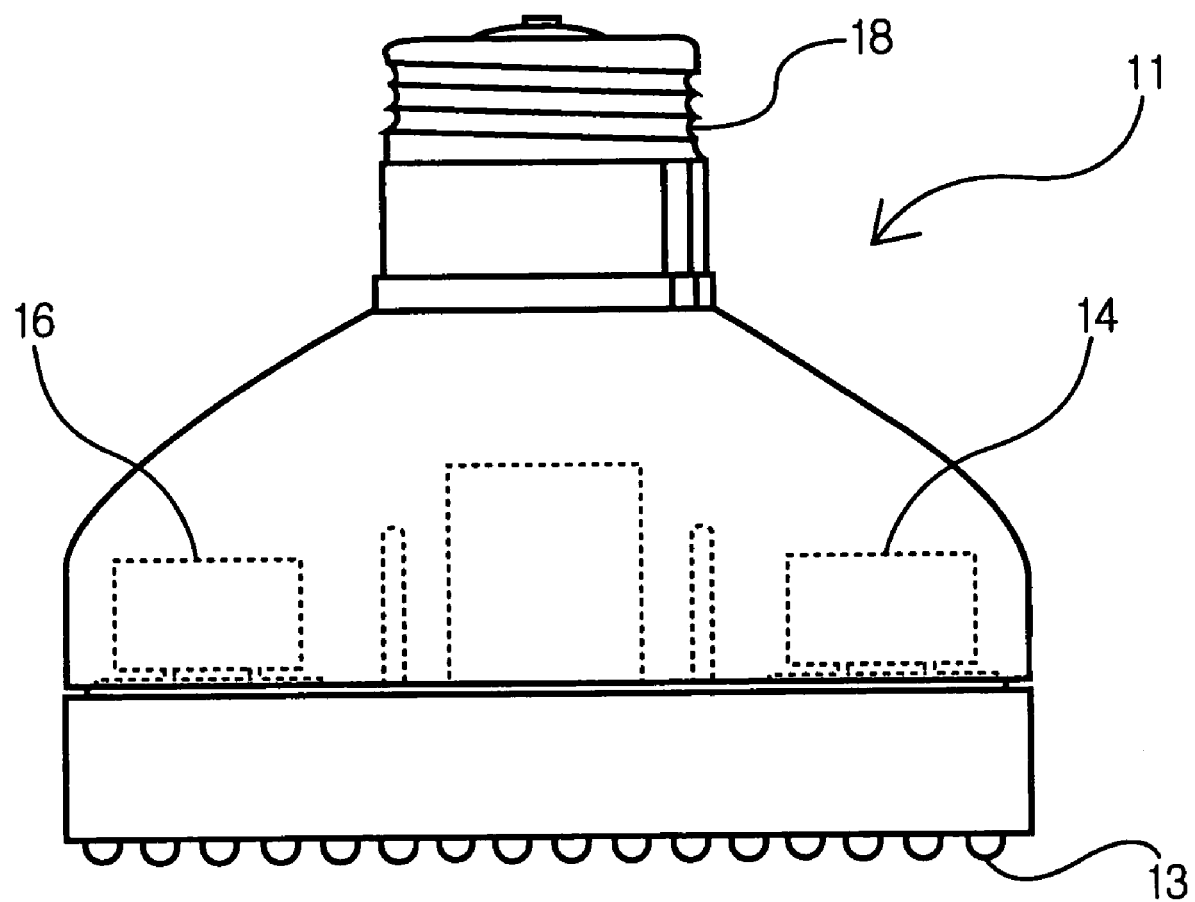

The adapter device 11 according to the present invention, shown in FIGS. 4A and 4B, differs in that it has a fastening structure 12, into which the non-built-in ballast-type compact fluorescent lamp 15 is fitted in a pushing manner, instead of the threaded fastening structure 2 of FIG. 3A, into which the built-in ballast-type compact fluorescent lamp 5 is fitted in a rotating manner. Furthermore, since a ballast is not installed inside the non-built-in ballast-type compact fluorescent lamp 15, a ballast 16 is installed on a board (not shown) within the adapter device 11, along with a DC power supply 14 for supplying DC current to the LEDs 13.

Figure 4C:
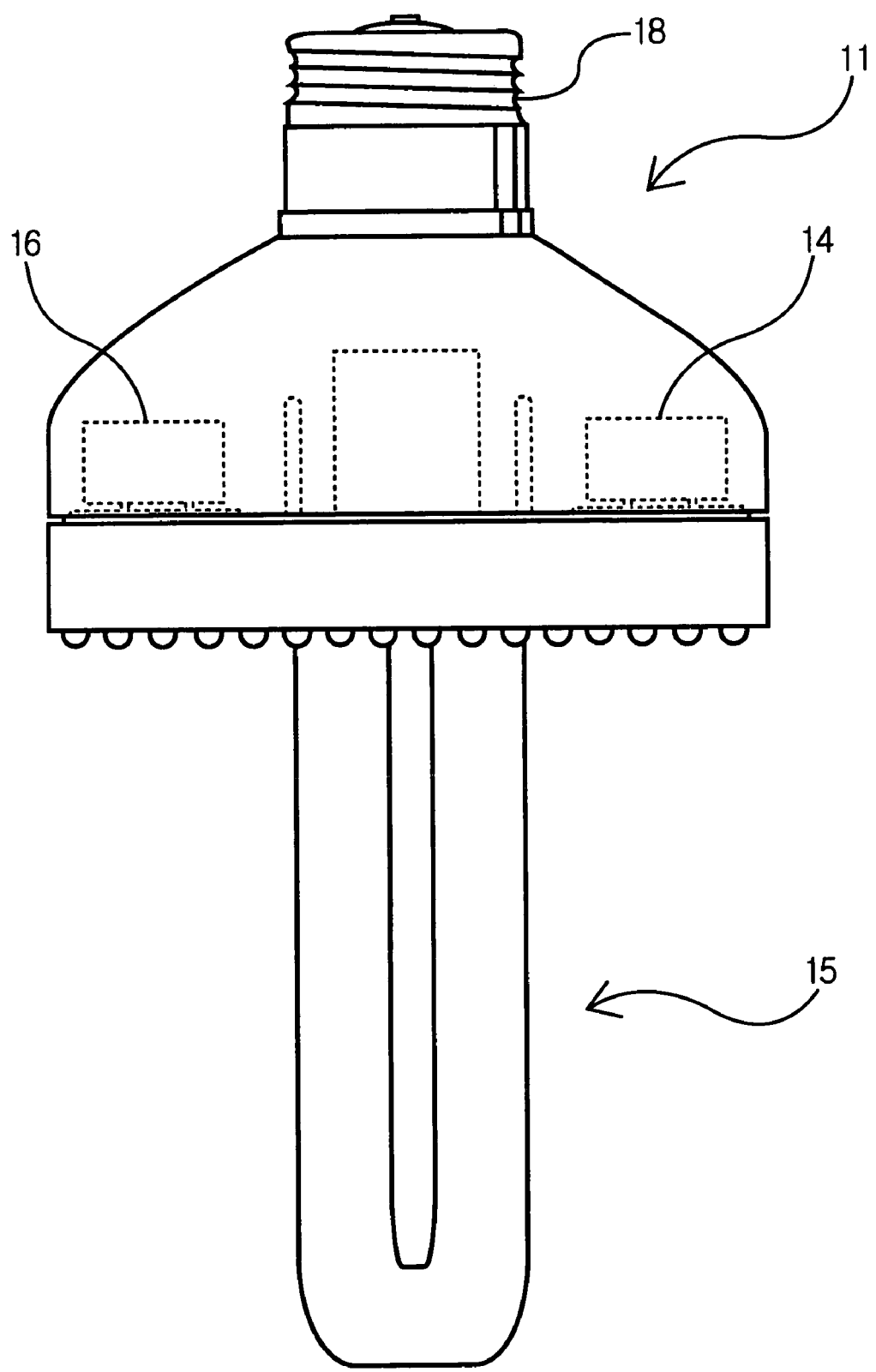

Now, in the state in which the non-built-in compact fluorescent lamp 15 is fitted into the adapter device 11 of the present invention by pushing it, as shown in FIG. 4C, a user connects the adapter device 11 to AC power (in the case of the U.S., 120V AC power) by coupling the cap 18 of the adapter device 11 with the lamp reception structure of a lighting apparatus for an incandescent lamp in a threaded manner.

Thereafter, when the user turns on the lighting apparatus, AC power is supplied to the board, so that the AC power is fed to the ballast 16, converted into high-frequency high-voltage power, and then supplied to the non-built-in ballast-type compact fluorescent lamp 15, thereby lighting the non-built-in ballast-type compact fluorescent lamp 15. Meanwhile, the AC power is also applied to the DC power supply 14, converted into DC power, and then applied to the LEDs 3-1, 3-2, 3-3 and 3-4, thereby lighting the LEDs 3-1, 3-2, 3-3, and 3-4.

By doing so, in the same way as shown in FIG. 3C, the non-built-in ballast-type compact fluorescent lamp 15 emits large amounts of blue light in a wavelength range of 430-450 nm, red-orange light in a wavelength range of 600-620 nm and yellow-green light in a wavelength range of 530-560 nm, and thus the non-built-in ballast-type compact fluorescent lamp 15 functions as a main light source that governs general brightness.

Furthermore, the LEDs 13-1 emit green light in a wavelength range of 498-530 nm, the LEDs 3-2 emit red light in a wavelength range from 620-700 nm, the LEDs 3-3 emit bluish green light at wavelengths around 495 nm and the LEDs 3-4 emit violet light in a wavelength range of 350-400 nm, and thus color rendering and sharpness are improved, thereby aiding in the action of eyesight.

In summary, when the existing non-built-in ballast-type compact fluorescent lamp 15 is combined with the adapter device 11 of the present invention, as shown in FIG. 4C, and AC power is applied to the combination, the non-built-in ballast-type compact fluorescent lamp 15 provides general brightness as a main light source, and the light of the green LEDs 13-1 in a wavelength range of 498-530 nm, the light of the red LEDs 13-2 in a wavelength range of 620-700 nm, light of the bluish green LEDs 13-3 at wavelengths around 495 nm and the light of the violet LEDs 13-4 in a wavelength range of 350-400 nm aid in improving color rendering and sharpness, thereby helping the action of eyesight.

Although the preferred embodiments of the present invention have been described above, it should be noted that the present invention is not limited to the embodiments, but may be applied to various modified embodiments to which the spirit of the present invention is applied.

For example, although the adapter device of the present invention has been described as being used to replace tungsten incandescent lamps or krypton incandescent lamps, the caps 8 and 18 of which have threaded fastening structures, the adapter device of the present invention may be applied to incandescent lamps having various types of fastening structures.

Figure 5:
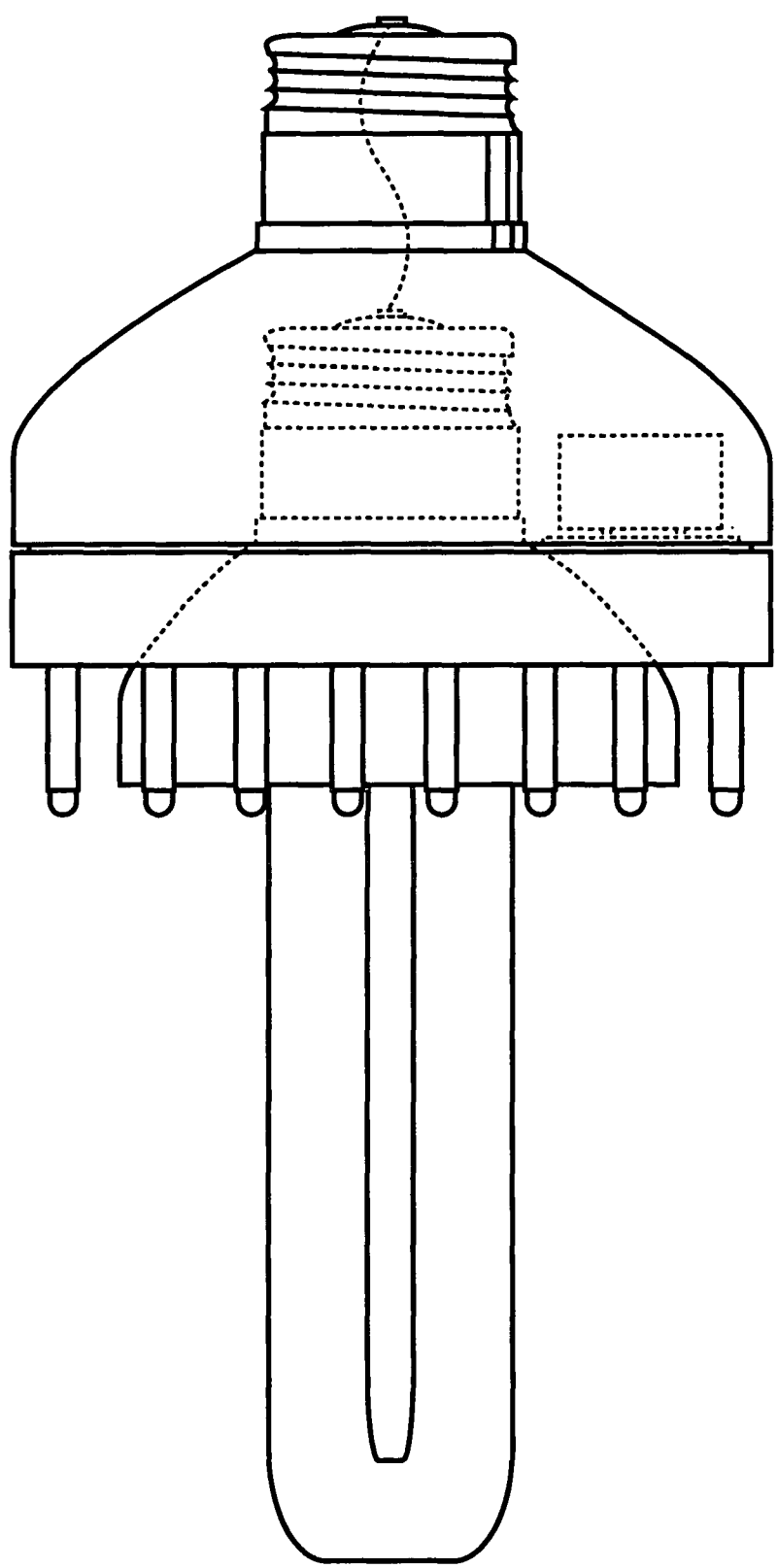
FIG. 5 is a view showing an adapter device for a built-in ballast-type compact fluorescent lamp according to the present invention, in which LEDs are installed on protruding supports.

Furthermore, although, in the adapter devices 1 and 11 of the present invention shown in FIGS. 3A to 3C and FIGS. 4A to 4C, the LEDs 3 and 13 are illustrated as being closely attached to the bottoms of the adapter devices 1 and 11, it is possible to attach LEDs to respective ends of supports extending from the bottom of an adapter device (see FIG. 5), to attach LEDs onto respective outer circumferential surfaces of the supports, or to attach LEDs to the side circumferential surfaces of the adapter devices 1 and 11.

When the above-described adapter device according to the present invention is used, color rendering and sharpness can be improved in the case in which a low power consumption type-compact fluorescent lamp is used instead of a high power consumption-type incandescent lamp in various existing lighting apparatuses for incandescent lamps.

What is claimed is:

1. An adapter device for enabling use of a compact fluorescent lamp in a lighting apparatus having a socket for an incandescent lamp, the adapter device comprising:
   a fastening structure for fastening the compact fluorescent lamp as a main light source to provide major brightness;
   a cap for supplying Alternating Current (AC) power to the fastening structure;
   green Light Emitting Diodes (LEDs) for emitting light in a wavelength range of 498-530 nm and red LEDs for emitting light in a wavelength range of 620-700 nm and bluish green LEDs for emitting light at a wavelength around 495 nm, the LEDs being positioned around the compact fluorescent lamp and improving color rendering and sharpness; and a power supply for supplying power to the green LEDs and the red LEDs and bluish green LEDs.

2. The adapter device as set forth in claim 1, wherein the compact fluorescent lamp is a built-in ballast-type compact fluorescent lamp.

3. The adapter device as set forth in claim 1, wherein the compact fluorescent lamp is a non-built-in ballast-type compact fluorescent lamp;

further comprising a ballast for the non-built-in ballast-type compact fluorescent lamp.

4. The adapter device as set forth in claim 1, wherein violet LEDs for emitting light in a wavelength range of 350-400 nm are further positioned around the compact fluorescent lamp, and the power supply supplies current to the violet LEDs.

5. The adapter device as set forth in claim 1, wherein the lighting apparatus is a desk lamp.

6. The adapter device as set forth in claim 1, further comprising supports extending from a bottom of the adapter device, wherein at least one of the LEDs is positioned on each of respective ends of the supports.

7. The adapter device as set forth in claim 1, further comprising supports extending from a bottom of the adapter device, wherein at least one of the LEDs is positioned on each of outer circumferential surfaces of the supports.

8. The adapter device as set forth in claim 1, wherein the LEDs are positioned on a side circumferential surface of the adapter device.

* * * * *